THOMAS RYAN.
Improvement in Corn Planter and Marker.
No. 123,514. Patented Feb. 6, 1872.
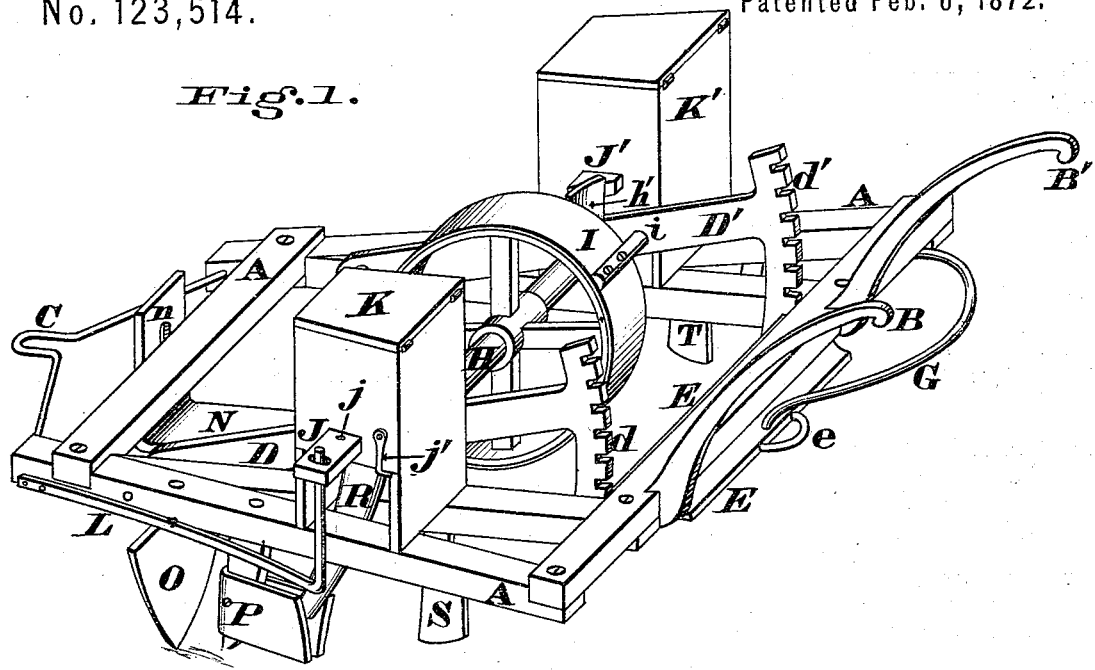
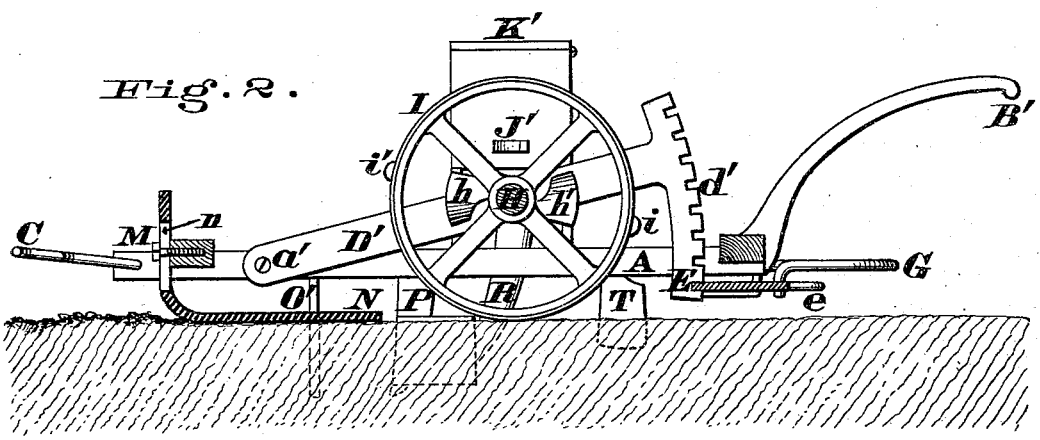
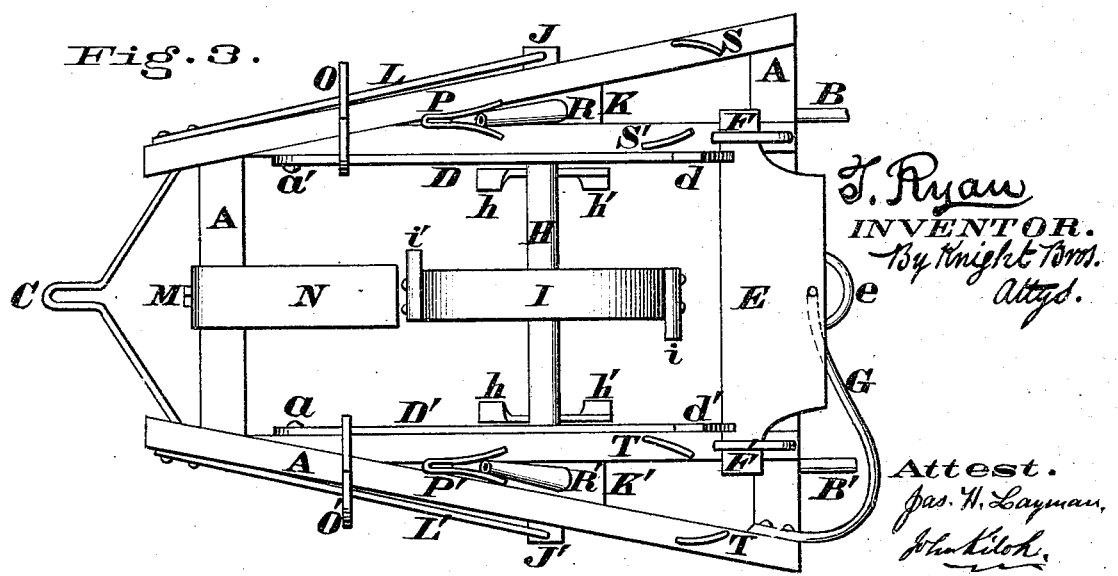
T. Ryan
INVENTOR.
By Knight Bros.
Attys.
Attest.
Jas. H. Layman,
John Kiloh.
AM. PHOTO-LITHOGRAPHIC CO. N.Y. (OSBORNE'S PROCESS.)

UNITED STATES PATENT OFFICE.

THOMAS RYAN, OF ST. MARTINS, OHIO.

IMPROVEMENT IN CORN-PLANTERS AND MARKERS.

Specification forming part of Letters Patent No. 123,514, dated February 6, 1872.

I, THOMAS RYAN, of St. Martins, Brown county, Ohio, have invented an Improved Corn-Planter and Marker, of which the following is a specification:

This invention relates to that class of implements which are arranged so as to plant two hills of corn at one operation, and in which the droppers are actuated and the machine supported by a single ground-wheel that occupies an intermediate position between the two hoppers, said wheel being journaled in an adjustable frame, for a purpose which will be hereinafter fully described. The second part of my improvements consist in attaching to the forward end of the machine a "runner," which serves to make a smooth and level track for the ground-wheel, so as to insure a perfect uniform rotation of the latter, and a consequent regularity in dropping and marking.

Figure 1 is a perspective view of a combined corn-planter and marker embodying my improvements. Fig. 2 is a longitudinal section of the implement; and Fig. 3 is a plan, showing the under side of the machine.

A represents the main frame of the implement, having customary handles, B B', and any approved form of clevis, C, for attachment of the team. Pivoted to the inner side of this main frame, and near the forward end thereof, as at $a$ $a'$, is a supplemental frame, which is composed of two stout bars, D D', whose rear ends are provided with segmental racks $d$ $d'$. Adapted to engage with these racks is a latch or detent, E, which plays within guides F F that are secured to the under side of frame A, as seen in Fig. 3. This detent is maintained in gear with the racks by a spring, G. A handle, $e$, permits the disengagement of said latch when required. Journaled in the supplemental frame D D' is the axle H of a ground-wheel, I, to whose periphery are secured two bars, $i$ $i$, that constitute the "markers" of the implement. Secured near the ends of the axle are cams $h$ $h'$, that are adapted to impinge against the inner ends of seed-slides J J', which reciprocate within the hoppers K K', the latter being attached to the main frame of the machine. The return stroke of the slides is effected by springs L L'. The slides may be provided with recesses $j$ for the reception of hooks or bolts $j'$ whenever it is desired to render either of said slides inoperative. Attached to the front part of the machine by bolt M, in such a position as to be directly in line with ground-wheel I, is a "runner," N, which is slotted at $n$, so as to be capable of vertical adjustment. The implement is provided with two shovel-plows, O O', two drill-teeth, P P', two seed-spouts or tubes, R R', and four covering-shares, S S' and T T', the position and arrangement of which are clearly shown in Fig. 3.

The operation of the implement is as follows: When placed in the field for use the machine should be adjusted in such a manner that the shovels, drills, and shares will penetrate the ground from one-half to two-thirds of their length, as seen at Fig. 2, and the runner N should rest flatly upon the surface of the earth. As the machine is drawn across the field the rotation of wheel I causes the cams $h$ $h'$ of axle H to impinge against the inner ends of slides J J', which are thereby forced out a sufficient distance to drop a proper quantity of corn down through the spouts R R' into the furrows made by the shovels O O' and drills P P'. As soon as the cams have escaped from the slides the latter are instantly restored to their normal position by the action of the springs L L'. As the runner N is rigidly attached to the forward end of the machine, it serves to make a smooth, level, and comparatively firm or unyielding track for the wheel I. This smoothening and leveling of the ground is one of the great advantages peculiar to my machine, as it serves to insure a perfect uniform rotation of wheel I, by which means the corn is dropped at regular intervals. Besides insuring a uniform rotation of the ground-wheel, this smooth track makes the depressions formed by the bars $i$ $i'$ much more conspicuous than would be the case if the runner was not used. The depressions formed in the smooth track by said markers $i$ $i'$ can be clearly seen for a considerable distance, and they thus serve as a guide to the operation in laying off the cross-rows, and in case it is discovered that the machine is not dropping in line, the implement can be shifted by hand and the error corrected.

If, in finishing up a field, it should be necessary to employ only one of the seed-slides, the other can be rendered inoperative by simply engaging hook $j'$ within the recess $j$.

The penetration of the shares is effected by raising and lowering the supplemental frame D D', and said frame can be adjusted in such a manner as to elevate the shares, shovels, &c., clear of the ground, so as to render the entire implement inoperative when passing along a road or in going from one field to another.

By detaching hoppers K K' and elevating ground-wheel I, the implement can be employed in the same manner as an ordinary harrow is.

In full-sized implements the single ground-wheel I is thirty-two inches in diameter, and consequently, ninety-six inches in circumference, and as said wheel is provided with two equidistant markers, $i\ i'$, one entire revolution makes two indentations in the ground, which indentations are four feet apart.

The seed-spouts R R', being the same distance apart as the markers $i\ i'$, the result is that the rows of corn are four feet from each other, as are also the hills in said rows. As the hills are thus formed at the uniform distance of four feet in both directions, the corn can be tended either way, as may be most convenient or advantageous.

The implement being mounted upon a single ground-wheel, it is consequently lighter and can be turned with greater ease and in a smaller space than a two-wheeled machine could be.

Each revolution of the wheel plants four hills and marks the cross-rows, so the operator can see the right place to begin at the end of the row, (also in any part of the field, as at every end he can adjust the planter as when turned in,) by raising the rear end of the machine and adjusting the wheel with his foot, to bring the markers in line with the work done. Then there is no variation to the other end of the row. When the field is planted the rows are alike both ways to plow. One man and team with planter will do the work of four men and four teams, besides the work of two droppers and six coverers in mellow ground, and do it correctly; and hand-hoeing of the subsequent crop is avoided.

The frame is composed of six pieces, two at each side, one front, and one rear; length, six feet; width of front, three feet and six inches; rear, five feet.

Claims.

I claim as my invention—

1. The vertically-adjustable runner N $n$, in combination with the ground-wheel I, with or without the cross-row markers $i\ i'$, and with the frame of the machine, said wheel and runner being constructed substantially as shown and described, and arranged between the two sets of furrowing, dropping, and covering devices, and said runner in front of said wheel, so as to smooth a track for the same, all substantially as herein set forth.

2. The adjusting devices, composed of the racks $d\ d'$ and the detent E, with its handle $e$, and spring G, in combination with the pivoted ground-wheel frame D D', for the purposes set forth, the same being constructed, combined, and arranged substantially as shown and described.

In testimony of which invention I hereunto set my hand.

THOS. RYAN.

Witnesses:
 GEO. H. KNIGHT,
 JAMES H. LAYMAN.